United States Patent [19]

Simonek et al.

[11] 4,269,409
[45] May 26, 1981

[54] ORIGINAL DOCUMENT TRANSPORT MECHANISM FOR ELECTROPHOTOGRAPHIC COPYING MACHINES

[75] Inventors: Rüdiger Simonek, Frankfurt; Peter Gumm, Glashütten; Hermann Idstein, Oestrich-Winkel; Horst Witte, Wiesbaden, all of Fed. Rep. of Germany

[73] Assignee: Hoechst Aktiengesellschaft, Frankfurt am Main, Fed. Rep. of Germany

[21] Appl. No.: 860,902

[22] Filed: Dec. 15, 1977

[30] Foreign Application Priority Data

Dec. 17, 1976 [DE] Fed. Rep. of Germany ....... 2657198

[51] Int. Cl.³ .................. B65H 5/12; B65H 5/14; B65H 5/02
[52] U.S. Cl. .................. 271/277; 271/265; 271/300; 271/301; 271/183
[58] Field of Search .............. 271/277, 64, 265, 273, 271/183, 85, 82, 268, 279, 300, 301; 355/3 SH, 75; 198/479, 650, 695, 696

[56] References Cited

U.S. PATENT DOCUMENTS

| | | | |
|---|---|---|---|
| 3,062,538 | 11/1962 | Rutkus | 271/277 |
| 3,148,878 | 9/1964 | Eichorn | 271/85 |
| 3,179,404 | 5/1965 | Felts et al. | 271/277 |
| 3,239,215 | 3/1966 | Davis . | |
| 3,241,665 | 3/1966 | Erk | 271/273 |
| 3,266,796 | 8/1966 | Hanely et al. | 271/265 |
| 3,563,536 | 2/1971 | Hanzlik | 271/277 |
| 3,689,143 | 9/1972 | Case . | |
| 3,797,929 | 3/1974 | Deacon | 271/277 |
| 3,977,673 | 8/1976 | Seto | 271/277 |
| 3,997,263 | 12/1976 | Stemmle | 271/64 |
| 4,043,665 | 8/1977 | Caldwell | 271/276 |

FOREIGN PATENT DOCUMENTS 2026063 3/1970 Fed. Rep. of Germany .
2199237 9/1972 France .

Primary Examiner—Bruce H. Stoner, Jr.
Assistant Examiner—Brian Bond
Attorney, Agent, or Firm—Schwartz, Jeffrey, Schwaab, Mack, Blumenthal & Koch

[57] ABSTRACT

Disclosed is an improved transport mechanism for cyclically conveying an original past an optical scanning device in an electrophotographic copying machine of the type in which a gripping unit engages a leading edge of an original during the entire cycling time, which reduces distortion, maximizes utilization of the transport mechanism, and enables the use of lower illumination intensities by optically scanning the original as a planar surface and by providing a pair of transport rollers downstream of the optical scanning device to insure a fast cycling and delivery of the original.

44 Claims, 7 Drawing Figures

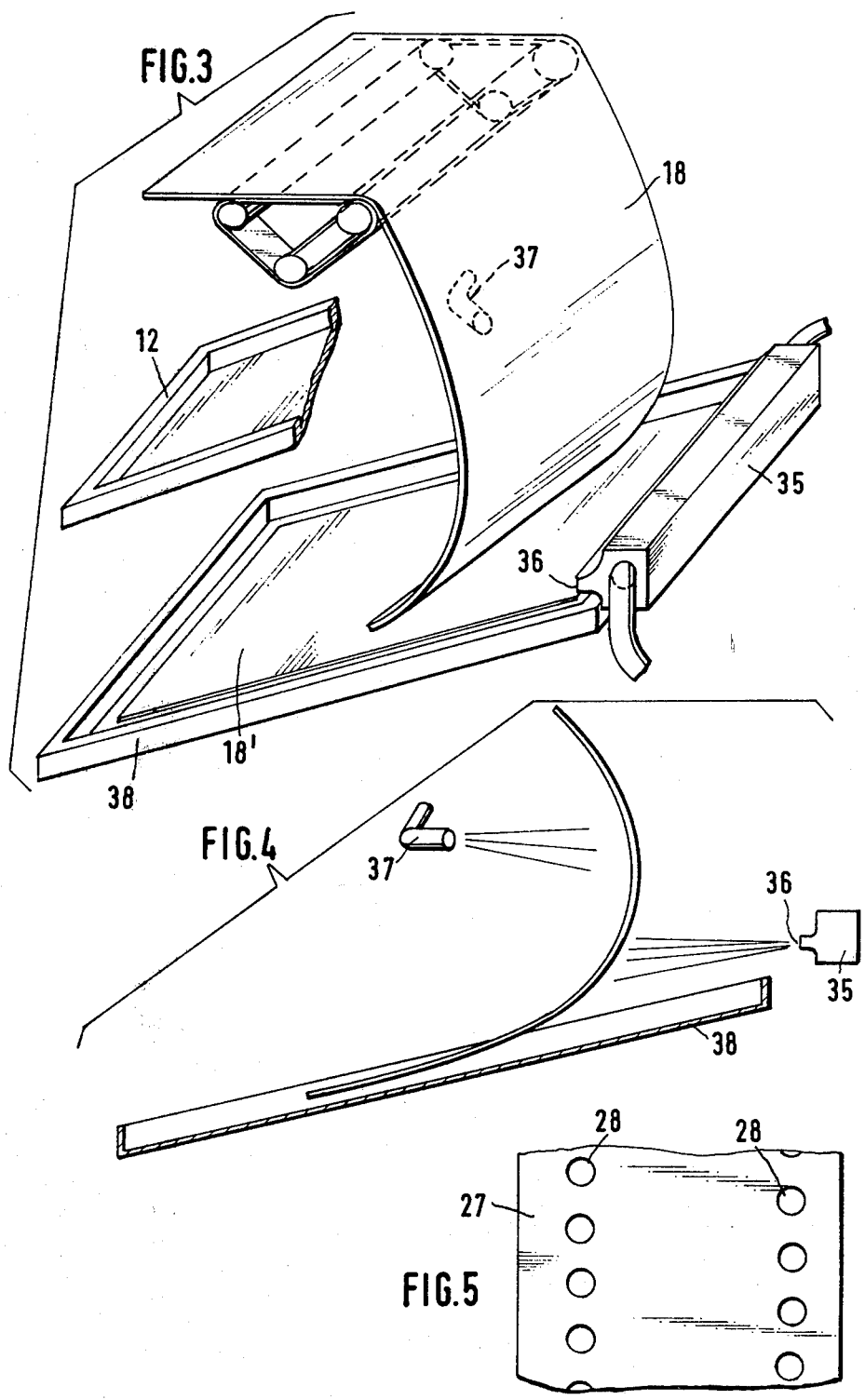

4,269,409

ORIGINAL DOCUMENT TRANSPORT MECHANISM FOR ELECTROPHOTOGRAPHIC COPYING MACHINES

BACKGROUND OF THE INVENTION

The present invention relates to a transport mechanism for repeatedly conveying an original to be copied past an optical scanning device in an electrophotographic copying machine of the type in which a leading edge of the original is continually carried by a gripping unit during the entire cycling operation. It particularly relates to a transport mechanism of the above-described type in which distortion is minimized and lower intensities of illumination are required than have heretofore been found necessary.

When an original is copied several times, the intervals for returning the original to its initial position after scanning and for delivering the original to the optical scanning device should be as short as possible. Machines which meet these requirements are disclosed in German Offenlegungsschrift No. 2 026 063 and U.S. Pat. No. 3,689,143. However, such machines perform optical scanning over a curved surface. If originals of widely varying sizes are to be copied in these machines, only very narrow scanning slots can be utilized since a high degree of transport mechanism utilization is required and the amount of distortion must be kept low. The use of narrow scanning slots in turn requires the use of high capacity illuminating equipment and/or a highly lightsensitive photoconducting material which often results in overheating of the apparatus.

The sheet conveyor mechanism known from German Offenlegungschrift No. 2 026 063 comprises a document drum, equipped with means for engaging the leading edge of an original to be copied, which conveys the leading edge of the original through the illumination and projection area of the reproducing machine by means of a driving arrangement, and then stops the leading edge at a predetermined point. After stopping of the leading edge, the trailing edge of the original is led past the illumination and projection station by conveyor belts provided in a lower region behind the document drum.

When the document drum is at rest the elastic conveyor belts exert a high pressure upon the original, in order to obtain an adequate frictional contact for further transport. Since the frictional force between the surfaces of the conveyor belts and the face of the original is counteracted by the frictional force between the back of the original and the document drum, a jerky movement results in the transition phase which may lead to a so-called "blurred" or shortened reproduction in which straight lines at a certain point show a slight distortion or contraction.

In U.S. Pat. No. 3,689,143 a sheet feeder mechanism is described in which a document drum transports the leading edge of an original through an optical scanning area by means of gripper fingers which engage the leading edge of the original. Optical scanning is performed on the curved surface of the document drum, which necessarily therefore requires the use of a narrow scanning slot, so that the problem of distortion and the problem associated with the use of high illumination intensities in the optical scanning area are presented.

Accordingly, there exists a great need in the art for a transport mechanism of the above-described type which reduces distortion to a minimum, provides a high degree of mechanism utilization when an original is repeatedly copied, and which eliminates overheating of the apparatus.

SUMMARY OF THE INVENTION

Accordingly, it is an object of the instant invention to provide an improved transport mechanism for cyclically conveying an original document past an optical scanning device, in an electrophotographic copying machine of the type in which a leading edge of the original is engaged by a gripping unit during the entire cycling operation, which reduces distortion.

It is an additional object of the present invention to provide an improved transport mechanism of the above-described type which achieves a high degree of utilization of the transport mechanism when repeatedly copying an original.

Still another object of the instant invention is the provision of an improved transport mechanism of the foregoing type which enables the use of lower illumination intensities for optical scanning and reproduction.

Yet another object of the present invention is the provision of an improved transport mechanism which obviates original creasing or folding.

In accordance with the present invention, these and other objects are achieved through an original document transport mechanism which comprises a gripping unit which engages a leading edge of the original and transports this edge over a closed path during the entire cycling operation such that the original is optically scanned as a planar surface; means connected to the gripping unit for driving the unit over the closed path; and a pair of transport rollers disposed above and below the path of the original which engage the original downstream of the optical scanning device and function to further convey the original after its leading edge has passed between the transport rollers.

In the preferred embodiment, moreover, the transport mechanism contemplated by the instant invention includes a suction table disposed below the optical scanning device to insure that the original is perfectly flat during scanning, means for preventing creasing or folding of the original during delivery, and a control switch and logic system which coordinates the movement of the gripping unit and the opening and closing thereof in response to the size of the original, the number of copies desired, and insertion of the original into the transport mechanism. Preferably the means for driving the gripping unit comprises a transport chain connected to each side of the gripping unit, a front pair of chain sprocket wheels, a back pair of chain sprocket wheels, and a pair of chain tension adjusting wheels, the arrangement of which defines the path of travel of the gripper. Means are also provided for lifting the upper transport roller out of the path of the gripping unit, and for opening and closing the gripping unit.

Other objects, features, and advantages of the instant invention will become apparent to the skilled artisan upon examination of the following detailed description of the present invention, taken in conjunction with the figures of the drawing.

BRIEF DESCRIPTION OF THE DRAWINGS

FIGS. 3 and 4 illustrate, respectively, a perspective view and a sectional view of an air nozzle system for guiding and preventing creasing or folding of an original during delivery; and FIG. 5 is a plan view of the suction table utilized in accordance with the present invention.

DETAILED DESCRIPTION OF THE PREFERRED EMBODIMENTS

The present invention seeks to improve the above-described prior art transport mechanisms such that distortion of the original is avoided to a large extent, a high degree of mechanism utilizing is achieved when an original is repeatedly copied, and such that lower illumination intensities may be utilized for illuminating and optical scanning to thereby prevent excessive heating of the apparatus. According to the present invention, these objects are achieved by a transport mechanism having a gripping unit comprising a gripper carrier which travels along a closed path and is guided on a plane in the area of the optical scanning device, and having transport rollers disposed above and below the path downstream of the scanning device which serve to further convey the original after its leading edge has passed between the transport rollers.

Scanning on a plane together with plane reproduction has the advantage that the width of the scanning slot does not influence distortion. Consequently, a wider scanning area may be provided, as compared to known scanning devices, so that the original may be illuminated at relatively low luminous capacities. Correct guiding of the original is guaranteed by the fact that the leading edge of the original is engaged by the gripping unit during the entire cycling operation, the gripping unit being on either side connected to transport chains which are driven via chain wheels. The overall height of the gripping unit is maintained very low in order to obtain the smallest possible distance between the illuminating equipment and the original, insuring maximum reproduction quality with a minimum of distortion.

A high degree of utilization of the cycling mechanism is provided by transporting the original solely by the transport rollers, after the gripping unit has passed between these rollers; as a result, a rapid delivery or, alternatively, a fast cycling of the original is insured.

Figure 1:
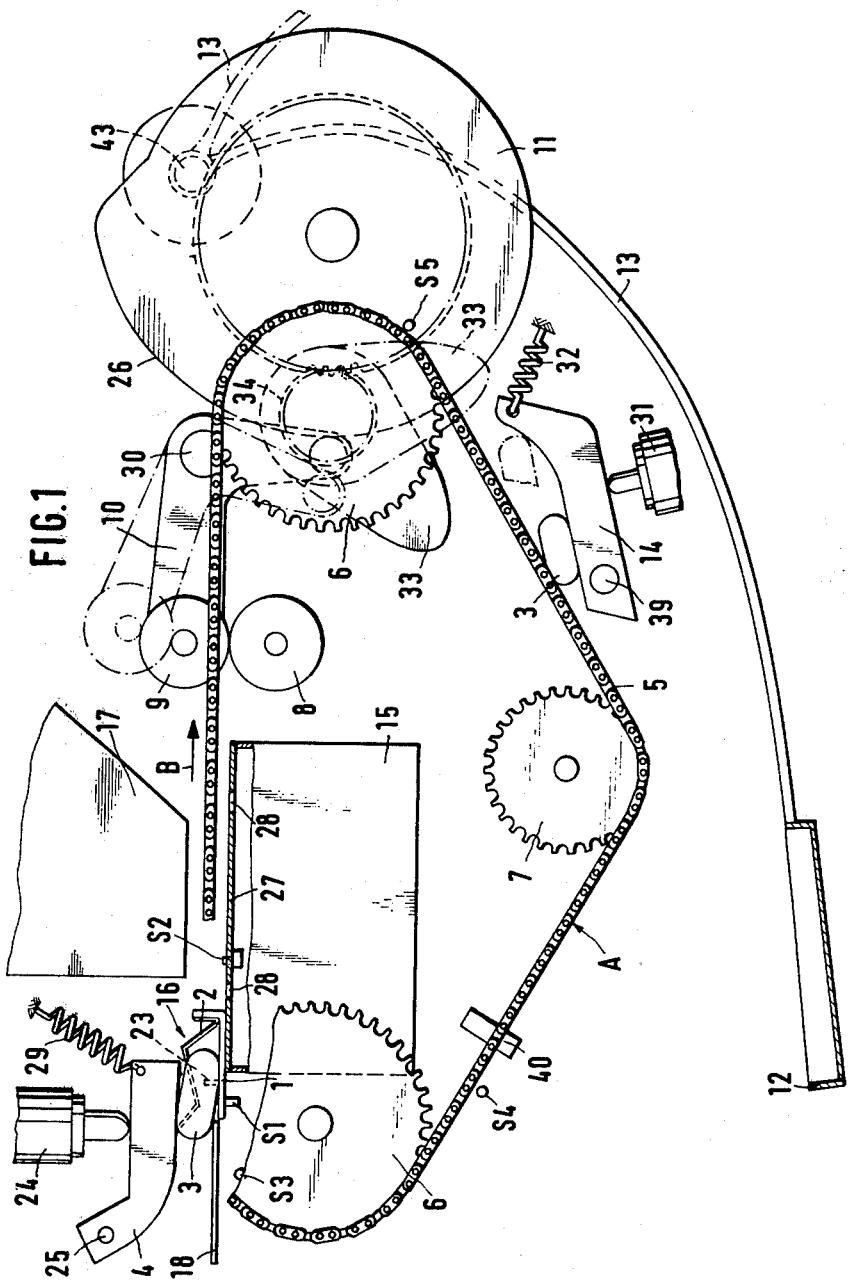
FIG. 1 is an elevational view of the transport mechanism according to the instant invention.

Referring to the drawings, FIG. 1 illustrates a gripping unit 16 in a waiting position. The gripping unit comprises individually spring-loaded grippers 2 which are equally spaced on and fastened to a gripper carrier 1 extending in transverse direction to the path A. In the waiting position of the gripping unit the grippers 2 are open. When an original 18 is introduced into the gripping unit 16, a first switch S1, disposed at the start of the plane section below the path A, causes the grippers 2 to close when the original 18 has adopted the correct position. The grippers 2 are preferably plate springs which are fastened to one leg 20' of the L-shaped gripper carrier 1. As the grippers 2 are each individually elastic, glued originals or originals with bordered edges may be correctly engaged with a proper alignment. The plate springs forming the grippers 2, have a zigzag shape (see FIG. 2A), and in the closed position, one of their edges 19 abuts the base 20 of the L-shaped gripper carrier 1.

The gripping unit 16 is on either side connected to transport chains 5 which are guided over one pair each of front and back chain sprocket wheels 6, and which are tensioned by a pair of chain tension adjusting wheels 7. The transport chains 5 define the course of the path A. The pairs of front and back chain sprocket wheels 6, together with the chain tension adjusting wheels 7, are arranged to form a triangle.

Figure 2A:
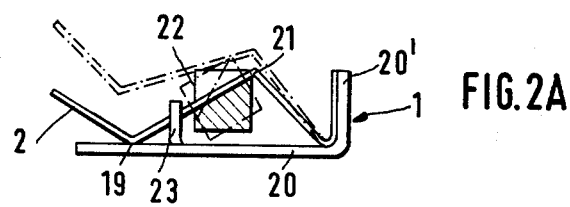
FIGS. 2A, B, and C are partial sectional, plan, and side views, respectively, of the gripping unit of the instant mechanism.
Figure 2B:
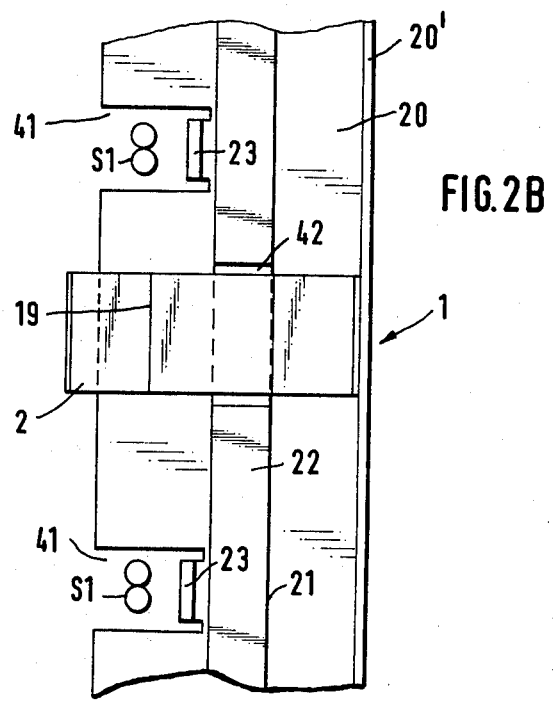
Figure 2C:
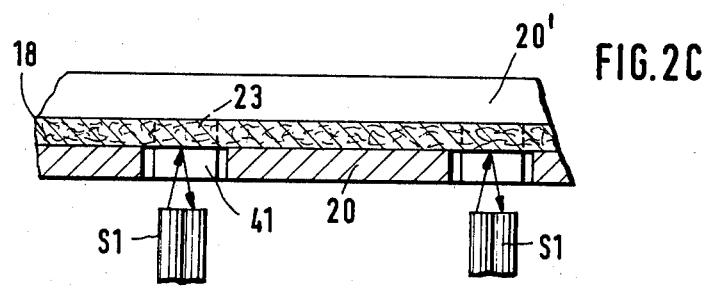

The first switch S1 comprises several light source/detector assemblies distributed over the width of the path. The base 20 of the gripper carrier 1 is provided with cutouts 41 distributed over the width of the carrier, corresponding in location with said light assemblies. When the gripping unit 16 is in the upper waiting position as shown in FIG. 1, the light assemblies forming the first switch S1 are below the cutouts 41. When the original 18 fully contacts stops 23 rising up from the base 20 light emanating from each light source assembly is reflected by the original 18 and returns back to the adjacent detector assembly (see FIG. 2C). Only when the light beams, which constitute light barriers, are reflected back to all the light source/detector assemblies of the switch (S1) in this manner is a signal released by which the grippers 2 are closed. For opening and closing the grippers 2, a pivotable square bar 22 is provided which extends across the width of the path and carries a gripping arm 3 at either end; in the closed as well as in the open position one edge 21 of the square bar 22 is in contact with the undersides of the grippers 2. The square bar 22 has a number of bevelled portions 42 (FIG. 2B) corresponding to the number of grippers 2, which contact the inclined portions of the grippers 2 rising from the edges 19 towards the edge 21 of the square bar. In FIG. 2A the open grippers are indicated by chain-dotted lines, whereas the closed grippers are indicated by continuous lines.

For pivoting the square bar 22, an elbow swivel plate 4 is disposed on either side of the gripping unit 16 in the plane of the gripping arms 3, which is pivoted into or out of the path of the corresponding gripping arm 3 by means of a solenoid-controlled lifting magnet member 24 acting as a pressing member and a tension spring 29. The swivel plate 4 forms an elbow and is pivotable about an axle 25. One end of the swivel plate 4 is engaged by the tension spring 29 while the tip of the lifting magnet member 24 is in contact with the upper surface of one leg of the swivel plate 4. The two lifting magnet members 24 are actuated by the first switch S1 as soon as the leading edge of the original 18 fully contacts the stops 23, as described above. The tips of the lifting magnet members 24 push the swivel plates 4 downwards against the pulling action of the tension springs 29 so that the gripping arms 3 and, at the same time, the square bar 22 are pivoted as they pass beneath the swivel plates 4. As a result, the grippers 2 adopt the position indicated by continuous lines in FIG. 2A. In the closed position of the grippers 2 the gripping unit 16 can then start to move in the direction of travel indicated by the arrow B of FIG. 1.

In order to hold down the free trailing edge of the original 18, a plane suction table 15 is provided, which is equipped with a perforated plate 27 on its upper side. The perforated plate 27 has at least two rows of holes 28 which are parallel to one another and which may be staggered, as shown by FIG. 5. If the two rows of holes 28 are outside the optical scanning area, to insure that the original 18 is absolutely flat on the perforated plate 27 staggering of the holes is not necessary. As a matter of practice, more than two rows of holes may be provided which are staggered when positioned inside the optical scanning area and which are not staggered when they are positioned outside the optical scanning area. The suction table 15 serves to maintain the original 18 within permissible deviations from the object distance required by the optical scanning device disposed thereabove. Staggering the rows of holes 28 distributes the holes over the scanning surface so that upon reproduction they do not become visible as dark areas on the copy. By thus staggering the rows of holes over the entire width of the original 18, possible dark areas are distributed as equally as possible so that the maximum fluctuations of brightness do not exceed ±1.5 percent.

Downstream of the optical scanning area, lower transport rollers 8 and upper transport rollers 9 are disposed. The transport rollers 8 and 9 extend over the width of the path A with the lower roller 8 and the upper roller 9 forming a nip through which the original is propelled. Each of the rollers 8 and 9 comprises a plurality of individual rollers, the length of which may e.g. be approximately 20 mm, mounted on a common shaft. The common shaft of the lower transport rollers 8 is stationary, while the axle of the upper transport rollers 9 may be pivoted. For this purpose, a pivotable lever 10 controlled by a cam disc 11 is mounted on one end of the axle of the upper transport rollers 9. The shaft of the lower transport rollers 8 is directly connected to a main drive (not shown) of the cycling mechanism, and is constantly driven during the operation of the driving motor. The cam disc 11 is disposed outside the transport chains 5. The lever 10 is pivotable on its axis 30, and is pivoted by contact with camming surface 26 of the cam disc 11. The cam disc 11 rotates in synchronism with the pair of back chain sprocket wheels 6. At least one pair of the chain sprocket wheels 6 is driven, and this is preferably the pair of back chain wheels. The cam disc 11 is designed in such a manner that it lifts the axle of the upper transport rollers 9 via the pivotable lever 10 when the gripping unit 16 passes below the optical scanning device 17. With the upper transport rollers 9 elevated above the path A, the gripping unit may freely pass between the upper and lower rollers. When the gripping unit 16 has advanced beyond this point, rotation of the cam disc 11 releases the lever 10, whereby the upper rollers 9 may again engage the original 18 and, in cooperation with the lower rollers 8, further convey it through the cycling mechanism.

In the area of the cam disc 11, but outside the path A of the original 18 a diverting means 13, rotatably mounted on shaft 43, is also disposed. The mode of operation of this diverting means 43 will be explained in detail below.

Also rotatably mounted on the shaft 34 of the back chain sprocket wheels are a plurality of fingers 33 which extend over the width of the path A. In FIG. 1, the retracted position of the fingers 33 is represented by continuous lines, and the pivoted position of the fingers is illustrated by chain-dotted lines. Pivoting of the fingers 33 about the shaft 34 is actuated by a switching signal from a fifth switch S5 positioned in the path A of the gripping unit 16 adjacent to one of the transport chains 5 and a corresponding back chain sprocket wheel 6, approximately in a 4 o'clock position relative to this chain wheel.

When the fingers 33 are pivoted, the original 18 which is being conveyed past the wheels 6 is pushed outwards in order to facilitate delivery of large size originals 18 to a lower delivery tray 38. This pushing movement by the fingers 33 enables the leading edge of the original 18 to slip out of the opened grippers 2.

Adjacent to the path A below the pair of back chain sprocket wheels 6 another swivel plate 14 is provided, which functions to open the grippers 2. The swivel plate 14 is constructed similarly to the swivel plate 4 and is pivotable about its axis 39. At an end of the swivel plate 14 remote from the axis 39, a tension spring 32 biases the swivel plate 14 out of the path of the gripping unit 16. For rotating the swivel plate 14 into engagement with the arms 3 of the gripping unit 16, a solenoid-controlled lifting magnet member 31 is provided which in its energized condition contacts the lower surface of the swivel plate 14 with its tip, rotating the plate 14 into the path A. One swivel plate 14 of this type is disposed on each side of the gripping unit 16, and during the last cycle of the original 18 is pivoted into the path of the corresponding gripping arm 3 by a counting pulse of the control logic of the mechanism. The back swivel plates 14 are pivoted simultaneously with the front swivel plates 4, the pivoting movement of which is also simultaneously released by the counting pulse. This counting pulse energizes the appertaining solenoid-controlled lifting magnet members 31 whose tips pivot the swivel plates 14 into the path of the gripping arms 3. The gripping arms 3 are inside the transport chains 5 and are thereby pivoted when the gripping unit 16 passes under the back swivel plates 14; as a result, the square bar 22 is rotated and opens the grippers 2. The transport rollers 8 and 9 are then utilized to further convey the original 18 up to the point of delivery. The grippers 2 are opened by the back swivel plates 14 only when one copy is made or during the last cycle of the original when several copies are made. During the other cycles in repeated copying, the back swivel plates 14 are not pivoted into the path of the gripping arms 3 by the lifting magnet members 31, so that the grippers 2 remain closed. Similarly, the front swivel plates 4 are not pivoted into the plane of the path of the gripping arms 3 during repeated copying. As a consequence, the grippers 2 remain closed and secure the leading edge of the original 18 during the entire cycling operation.

In a further embodiment of the instant invention, originals of smaller sizes, such as DIN A 3 and DIN A 4, are delivered separately from the larger sizes, such as DIN A 0 to DIN A 2. Separation is effected by the diverting means 13, which is rotated towards the path A for smaller sizes and away from the path A for copying large sizes, as illustrated by the continuous and chain-dotted lines in FIG. 1. As illustrated in FIG. 3, two delivery trays 12 and 38 are provided below the cycling mechanism, the upper delivery tray 12 receiving the smaller sizes and the lower delivery tray 38 receiving the larger sizes. When a single cycle of the original 18 or the last cycle of the original in repeated copying is indicated and the back swivel plates 14 have opened the grippers 2, as described above, the original 18 is delivered to the upper delivery tray 12 by the upper and lower transport rollers 8 and 9. For large sizes, the diverting means 13 is outwardly rotated and an air nozzle 37, disposed below the cycling mechanism, is actuated which, for a short time of 0.2 to 1 second, preferably 0.5 second, directs blast air upon the back of the original 18. This insures that a large size original 18 cannnot get creased and moves along a uniformly curved path towards the lower delivery tray 38. The lower delivery tray 38 may already contain one or more originals 18'. An air chamber 35 is positioned at a slight lateral distance above this delivery tray 38, and through the air nozzle 36 directs a stream of supporting air towards the original 18. This supporting air quarantees that, on the one hand, the leading edge of the original 18 is curved relative to the surface of the delivery tray 38 and that, on the other hand, the originals can be correctly placed into the tray even when several originals from preceding copying cycles ae already in the delivery tray 38. In this manner, e.g. up to 30 originals may be stacked in the delivery tray 38. Normally, the air nozzle 37 supplying blast air is switched on during each repeated cycle of the original 18, in order to form an air cushion which avoids a possible stiffening due to tears or creases in the original. The air nozzle 36 supplying the supporting air is switched on, and as soon as a second switch S2 indicates the last cycle of the original 18 the nozzle 36 is switched off via timing elements following a certain time lag. Simultaneously, the air nozzle 37 is switched on. Through this provision, an original 18 which has its leading edge resting in the lower delivery tray 38 cannot get creased during passage out of the cycling mechanism. The original 18 may therefore be further facilely conveyed by the lower and upper transport rollers 8 and 9 until it finally leaves the cycling mechanism.

For coordinating the movement of the gripping unit with the reproduction cycle, a fourth switch S4 is arranged in the path A of the gripping unit 16 close to one of the transport chains 5 and preceding the corresponding front chain sprocket wheel 6. This fourth switch S4 stops the gripping unit 16 in a lower waiting position, corresponding approximately to the 7 o'clock position on the front chain wheel 6. This lower waiting position is used when the last copy is made and also in repeated copying when larger sizes, e.g., DIN A 0 to DIN A 2, are scanned. When copying larger sizes, it is impossible to move the gripping unit 16 directly into the upper waiting position since this position is still taken up by that portion of the original which is not yet scanned. As shown in FIG. 1, the upper waiting position corresponds approximately to the one o'clock position on the front chain sprocket wheel 6. The upper waiting position is usually adopted by originals 18 which are shorter than the path of the gripping unit 16 in one cycle, e.g., DIN A 3 and DIN A 4 sizes.

When copying originals of the sizes DIN A 0 to DIN A 2 the gripping unit 16 is stopped in the lower waiting position following actuation of the fourth switch S4, and it only proceeds to the upper waiting position when a second switch S2 has been reset by the trailing edge of the original 18. Since the front swivel plates 4 have previously been pivoted downwards into the path of motion of the gripping arms 3, the gripping unit 16 is open, so that another original can be introduced therein.

For stopping the gripping unit 16 in the upper waiting position, a third switch S3 is provided adjacent one of the transport chains and alongside the circumference of the corresponding front chain sprocket wheel 6, at approximately the 11 o'clock position thereof.

Preferably, the third, fourth and fifth switches S3, S4 and S5 are designed as light source/detector assemblies disposed in the plane of the path A of the gripping unit 16 or in parallel thereto. Each of these three switches is actuated by a lug 40 which is attached to one of the transport chains 5 and interrupts the light beams when it passes the light barrier of each light source/detector assembly.

The second switch S2 is preferably a microswitch which is incorporated into the suction table 15, and projects into the path A of the gripping unit 16 by means of a lug.

While the invention has now been described in terms of certain preferred embodiments, the skilled artisan will appreciate that various changes, modifications, omissions, and substitutions may be made without departing from the spirit thereof. Accordingly, it is intended that the scope of the present invention be limited solely by that of the following claims.

What is claimed is:

1. A transport mechanism for cyclically conveying an original document past an optical scanning device in an electrophotographic copying machine, comprising:
    (a) a gripping unit which engages a leading edge of said original and transports this edge over a closed path during the entire cycling operation, said path of travel of said gripping unit forming a planar section in the region of said optical scanning device such that the original is presented as a planar surface for optical scanning;
    (b) means connected to said gripping unit for driving said unit over said closed path, said means for driving said gripping unit comprising a transport chain connected to each side of said gripping unit, a front pair of chain sprocket wheels, a back pair of chain sprocket wheels, and a pair of chain tension adjusting wheels, the arrangement of said wheels defining the path of travel of said gripping unit, and each of said pairs of wheels being mounted on a common shaft, the front sprocket wheels, the back sprocket wheels, and the chain tension adjusting wheels arranged in pairs and forming a triangle relative to one another;
    (c) a pair of transport rollers disposed above and below the path of the original which engage said original downstream of said optical scanning device and function to further convey said original; and
    (d) a suction table disposed below said optical scanning device, said suction table comprising a perforated plate with at least two parallel rows of staggered holes.

2. The mechanism of claim 1, wherein at least one pair of said chain sprocket wheels is driven.

3. The mechanism of claim 1, further comprising means for lifting said upper transport roller when the gripping unit passes under the optical scanning device to thereby allow the gripping unit to pass thereunder.

4. The mechanism of claim 3, wherein said lifting means comprises a pivotable lever secured to the axle of said upper transport roller, and a cam disc which rotates in synchronism with said pair of back chain sprocket wheels, said cam disc having a cam surface thereon which engages said pivotable lever, whereby said upper transport roller is lifted out of the path of said gripping unit.

5. The mechanism of claim 4, further comprising a rotatably mounted diverting means positioned outside of the path of said gripping unit in the vicinity of said cam disc for directing an original into an upper delivery tray for small-sized originals.

6. The mechanism of claim 1, further comprising a second switch (S2) disposed in said suction table in the planar section of the path of travel of said gripping unit, which is reset by a trailing edge of an original, and which causes the gripping unit to move from a lower waiting position corresponding approximately to the seven o'clock position on said front chain sprocket wheels to an upper waiting position corresponding approximately to the one o'clock position on said front chain sprocket wheels.

7. The mechanism of claim 6, wherein said second switch (S2) comprises a microswitch.

8. The mechanism of claim 6, further comprising a third switch (S3) disposed adjacent one of said transport chains in the path of said gripping unit along the circumference of said front chain sprocket wheels at approximately the eleven o'clock position thereof, which functions to stop said gripping unit in its upper waiting position.

9. The mechanism of claim 8, wherein said third switch (S3) comprises a light source/detector assembly disposed in the path of the gripping unit or in a plane parallel thereto, which is actuated by passage of a lug attached to one of said transport chains through a light barrier of said light source/detector assembly.

10. The mechanism of claim 6, further comprising a fourth switch (S4) disposed in the path of said gripping unit adjacent one of the transport chains and preceding the front chain sprocket wheel, which functions to stop the gripping unit in its lower waiting position.

11. The mechanism of claim 10, wherein said fourth switch (S4) comprises a light source/detector assembly disposed in the path of the gripping unit or in a plane parallel thereto, which is actuated by passage of a lug attached to one of said transport chains through a light barrier of said light source/detector assembly.

12. The mechanism of claim 1, further comprising a pair of fingers pivotably mounted on the shaft of said back chain sprocket wheels, which function in their pivoted position to deflect an original into a delivery receptacle.

13. The mechanism of claim 12, further comprising a fifth switch (S5) disposed in the path of said gripping unit adjacent one of said transport chains at approximately the four o'clock position of said back chain sprocket wheels, which when actuated pivots said fingers on said back chain sprocket wheel shaft.

14. The mechanism of claim 13, wherein said fifth switch (S5) comprises a light source/detector assembly disposed in the path of the gripping unit or in a plane parallel thereto, which is actuated by passage of a lug attached to one of said transport chains through a light barrier of said light source/detector assembly.

15. The mechanism of claim 6, further comprising first and second air nozzles disposed below said transport mechanism such that an original to be delivered passes therebetween, said air nozzles serving to guide the original into a delivery receptacle.

16. The mechanism of claim 15, wherein said first air nozzle is actuated during each repeated cycle of an original, and said second air nozzle is actuated during each cycle and then switched off following a certain time lag when said second switch (S2) senses a last cycle of said original.

17. A transport mechanism for cyclically conveying an original document past an optical scanning device in an electrophotographic copying machine, comprising:
(a) a gripping unit which engages a leading edge of said original and transports this edge over a closed path during the entire cycling operation, said path of travel of said gripping unit forming a planar section in the region of said optical scanning device such that the original is presented as a planar surface for optical scanning;
(b) means connected to said gripping unit for driving said unit over said closed path, said means for driving said gripping unit comprising a transport chain connected to each side of said gripping unit, a front pair of chain sprocket wheels, a back pair of chain sprocket wheels, and a pair of chain tension adjusting wheels, the arrangement of said wheels defining the path of travel of said gripping unit, and each of said pairs of wheels being mounted on a common shaft, the front sprocket wheels, the back sprocket wheels, and the chain tension adjusting wheels arranged in pairs and forming a triangle relative to one another; and
(c) a pair of transport rollers disposed above and below the path of the original which engage said original downstream of said optical scanning device and function to further convey said original, wherein said gripping unit comprises:
(i) an L-shaped gripper carrier extending in a direction transverse to the direction of gripping unit travel, said carrier having a first original-receiving section and a second section perpendicular to said first section;
(ii) a plurality of spring-loaded grippers spacedly fastened to said carrier second section; and
(iii) a pivotable square bar extending across the width of said path, said bar having an edge which contacts said grippers, and having at each end thereof an arm.

18. The mechanism of claim 17, wherein said grippers comprise plate springs which have a zig-zag shape and which have an edge which contacts the carrier first section when said gripper is in its closed position.

19. The mechanism of claim 17, wherein the arms of said square bar are situated inside the transport chains.

20. The mechanism of claim 17, wherein said gripper carrier first section has a plurality of cut-out sections therein, and a plurality of stops integral therewith.

21. The mechanism of claim 20, further comprising means for opening and closing said gripping unit.

22. The mechanism of claim 21, wherein said opening and closing means comprises a pair of spring-biased pivotable front and back swivel plates disposed in the plane of said gripping unit, said swivel plates forming an elbow, each pair of which rotates about a common axle, and engages the arms of said gripping unit square bar to thereby open and close said gripping unit.

23. The mechanism of claim 22, wherein said back pair of swivel plates is located downstream of said pair of back chain sprocket wheels.

24. The mechanism of claim 22, wherein said front pair of swivel plates is located upstream of said optical scanning device at the beginning of the planar section of said gripping unit's path of travel.

25. The mechanism of claim 22, wherein said swivel plates are pivoted by a pair of solenoid-controlled lifting magnet members which are actuated by a logic system.

26. The mechanism of claim 25, further comprising a first switch (S1) which is disposed at the beginning of the planar section of said gripping unit's path of travel at approximately the one o'clock position on the front chain sprocket wheels, said one o'clock position defining an upper waiting position for said gripping unit, said first switch (S1) functioning to actuate said pressing members to close said grippers when a leading edge of an original is inserted into said gripping unit and contacts said stops.

27. The mechanism of claim 26, wherein said first switch (S1) comprises a plurality of light source/detector assemblies which are positioned beneath the cut-outs of said gripping unit when said gripping unit is in its upper waiting position, and which actuate said switch (S1) when light is emitted from the light source assemblies and reflected back to said detector assemblies by an original contacting the stops of said gripping unit.

28. The mechanism of claim 27, further comprising a suction table disposed below said optical scanning device, and a second switch (S2) disposed in said suction table in the planar section of the path of travel of said gripping unit, which is reset by a trailing edge of an original, and which causes the gripping unit to move from a lower waiting position corresponding approximately to the seven o'clock position on said front chain sprocket wheels to an upper waiting position corresponding approximately to the one o'clock position on said front chain sprocket wheels.

29. The mechanism of claim 28, wherein said second switch (S2) comprises a microswitch.

30. The mechanism of claim 28, further comprising a third switch (S3) disposed adjacent one of said transport chains in the path of said gripping unit along the circumference of said front chain sprocket wheels at approximately the eleven o'clock position thereof, which functions to stop said gripping unit in its upper waiting position.

31. The mechanism of claim 30, wherein said third switch (S3) comprises a light source/detector assembly disposed in the path of the gripping unit or in a plane parallel thereto, which is actuated by passage of a lug attached to one of said transport chains through a light barrier of said light source/detector assembly.

32. The mechanism of claim 28, further comprising a fourth switch (S4) disposed in the path of said gripping unit adjacent one of the transport chains and preceding the front chain sprocket wheel, which functions to stop the gripping unit in its lower waiting position.

33. The mechanism of claim 32, wherein said fourth switch (S4) comprises a light source/detector assembly disposed in the path of the gripping unit or in a plane parallel thereto, which is actuated by passage of a lug attached to one of said transport chains through a light barrier of said light source/detector assembly.

34. The mechanism of claim 28, further comprising first and second air nozzles disposed below said transport mechanism such that an original to be delivered passes therebetween, said air nozzles serving to guide the original into a delivery receptacle.

35. The mechanism of claim 34, wherein said first air nozzle is actuated during each repeated cycle of an original, and said second air nozzle is actuated during each cycle and then switched off following a certain time lag when said second switch (S2) senses a last cycle of said original.

36. The mechanism of claim 17, further comprising means for lifting said upper transport roller when the gripping unit passes under the optical scanning device to thereby allow the gripping unit to pass thereunder.

37. The mechanism of claim 36, wherein said lifting means comprises a pivotable lever secured to the axle of said upper transport roller, and a cam disc which rotates in synchronism with said pair of back chain sprocket wheels, said cam disc having a cam surface thereon which engages said pivotable lever, whereby said upper transport roller is lifted out of the path of said gripping unit.

38. The mechanism of claim 37, further comprising a rotatably mounted diverting means positioned outside of the path of said gripping unit in the vicinity of said cam disc for directing an original into an upper delivery tray for small-sized originals.

39. The mechanism of claim 17, further comprising a pair of fingers pivotably mounted on the shaft of said back chain sprocket wheels, which function in their pivoted position to deflect an original into a delivery receptacle.

40. The mechanism of claim 39, further comprising a fifth switch (S5) disposed in the path of said gripping unit adjacent one of said transport chains at approximately the four o'clock position of said back chain sprocket wheels, which when actuated pivots said fingers on said back chain sprocket wheel shaft.

41. The mechanism of claim 40, wherein said fifth switch (S5) comprises a light source/detector assembly disposed in the path of the gripping unit or in a plane parallel thereto, which is actuated by passage of a lug attached to one of said transport chains through a light barrier of said light source/detector assembly.

42. A transport mechanism for cyclically conveying an original document past an optical scanning device in an electrophotographic copying machine, comprising:
(a) a gripping unit which engages a leading edge of said original and transports this edge over a closed path during the entire cycling operation, said path of travel of said gripping unit forming a planar section in the region of said optical scanning device such that the original is presented as a planar surface for optical scanning;
(b) means connected to said gripping unit for driving said unit over said closed path, said means for driving said gripping unit comprising a transport chain connected to each side of said gripping unit, a front pair of chain sprocket wheels, a back pair of chain sprocket wheels, and a pair of chain tension adjusting wheels, the arrangement of said wheels defining the path of travel of said gripping unit, and each of said pairs of wheels being mounted on a common shaft, the front sprocket wheels, the back sprocket wheels, and the chain tension adjusting wheels arranged in pairs and forming a triangle relative to one another;
(c) a pair of transport rollers disposed above and below the path of the original which engage said original downstream of said optical scanning device and function to further convey said original; and
(d) a pair of fingers pivotably mounted on the shaft of said back chain sprocket wheels, which function in their pivoted position to deflect an original into a delivery receptacle.

43. The mechanism of claim 42, further comprising a switch (S5) disposed in the path of said gripping unit adjacent one of said transport chains at approximately the four o'clock position of said back chain sprocket wheels, which when actuated pivots said fingers on said back chain sprocket wheel shaft.

44. The mechanism of claim 43, wherein said switch (S5) comprises a light source/detector assembly disposed in the path of the gripping unit or in a plane parallel thereto, which is actuated by passage of a lug attached to one of said transport chains through a light barrier of said light source/detector assembly.

* * * * *